(12) United States Patent
Tan et al.

(10) Patent No.: US 7,729,249 B2
(45) Date of Patent: Jun. 1, 2010

(54) SYSTEMS AND METHODS FOR IMPROVING TCP-FRIENDLINESS OF DELAY-BASED CONGESTION CONTROL

(75) Inventors: Kun Tan, Beijing (CN); Murari Sridharan, Sammamish, WA (US); Jingmin Song, Beijing (CN)

(73) Assignee: Microsoft Corporation, Redmond, WA (US)

(*) Notice: Subject to any disclaimer, the term of this patent is extended or adjusted under 35 U.S.C. 154(b) by 245 days.

(21) Appl. No.: 11/941,815

(22) Filed: Nov. 16, 2007

(65) Prior Publication Data

US 2009/0022055 A1    Jan. 22, 2009

Related U.S. Application Data

(60) Provisional application No. 60/959,899, filed on Jul. 16, 2007.

(51) Int. Cl.
*H04J 1/16* (2006.01)
(52) U.S. Cl. .................................................. 370/230
(58) Field of Classification Search .................. 370/230, 370/235, 229, 230.1, 231, 232, 233, 234, 370/237, 252, 412, 413, 236, 395.4, 395.41, 370/395.43, 415, 416; 709/230, 233, 231, 709/232, 234, 238
See application file for complete search history.

(56) References Cited

U.S. PATENT DOCUMENTS

| 5,193,151 | A  | * | 3/1993 | Jain ........................... 709/237 |
| 6,252,851 | B1 |   | 6/2001 | Siu et al. ..................... 370/236 |
| 6,901,593 | B2 |   | 5/2005 | Aweya et al. ............... 718/104 |
| 6,922,390 | B1 |   | 7/2005 | Chapman et al. ............ 370/229 |
| 7,047,312 | B1 | * | 5/2006 | Aweya et al. ............... 709/235 |
| 7,099,954 | B2 | * | 8/2006 | Li et al. ....................... 709/233 |
| 7,225,266 | B2 |   | 5/2007 | Ameigeiras et al. ......... 709/235 |
| 7,324,442 | B1 | * | 1/2008 | Pan et al. .................... 370/230 |
| 7,394,762 | B2 | * | 7/2008 | Leith et al. .................. 370/229 |
| 2004/0218617 | A1 |  | 11/2004 | Sagfors ..................... 370/412 |
| 2005/0018617 | A1 |  | 1/2005 | Jin et al. .................... 370/252 |
| 2005/0213507 | A1 |  | 9/2005 | Banerjee et al. ............ 370/241 |
| 2006/0050640 | A1 |  | 3/2006 | Jin et al. .................... 370/235 |
| 2006/0114830 | A1 |  | 6/2006 | Shimonishi et al. ......... 370/241 |
| 2006/0227708 | A1 |  | 10/2006 | Tan et al. .................... 370/235 |

OTHER PUBLICATIONS

Itaya, N et al., "Dynamic Parameter Adjustments for Available-Bandwidth Estimation of TCP in Wired-Wireless Networks", Science Direct, Computer Communications, www.sciencedirect.com, 1 page Abstract.
Sridharan, M. et al., "Compound TCP: A New TCp Congestion Control for High-Speed and Long Distance Networks", Downloaded from the Internet Sep. 5, 2007, www.mirror.switch.ch, 7 pages.

* cited by examiner

*Primary Examiner*—Chi H Pham
*Assistant Examiner*—Alexander Boakye
(74) *Attorney, Agent, or Firm*—Woodcock Washburn LLP

(57) ABSTRACT

Disclosed herein is a novel technique that greatly improves the TCP-friendliness of CTCP over such under-buffered network links without degrading the protocol efficiency to utilize the link capacity. Instead of using a pre-defined threshold, the disclosed approach, which may be referred to herein as "CTCP-TUBE," dynamically adjusts the threshold based on the network setting in which the flow is operating. The backlogged packets of a regular TCP may be estimated along the same path by emulating the behavior of a regular TCP flow in runtime. Based on this, a threshold is set so as to ensure good TCP-friendliness. CTCP-TUBE can automatically adapt to different network configurations and also concurrent competing flows.

17 Claims, 4 Drawing Sheets

```
1  Initialization:
2      Diff_reno = invalid;
3      Gamma = 30;
4
5  On-The-End-of-Round:
6      Expected_reno = cwnd / baseRTT;
7      Actual_reno   = cwnd / RTT;
8      Diff_reno= (Expected_reno-Actual_reno)
9                                    *baseRTT;
10
11 On-Packet-Loss:
12     If Diff_reno is valid then
13         g_star = 3/4*Diff_reno;
14         gamma=gamma*(1-lamda)+ lamda*g_star;
15         if (gamma < g_low) gamma=g_low;
16         elsif (gamma > g_high) gamma=g_high;
17         fi
18         Diff_reno = invalid;
19     fi
```

SYSTEMS AND METHODS FOR IMPROVING TCP-FRIENDLINESS OF DELAY-BASED CONGESTION CONTROL

CROSS-REFERENCE TO RELATED APPLICATIONS

This application claims benefit of provisional U.S. patent application No. 60/959,899, the contents of which are incorporated herein by reference.

BACKGROUND

Transmission Control Protocol (TCP) provides reliable data transmission with an embedded congestion control algorithm that effectively removes congestion collapses in the Internet by adjusting the sending rate according to the available bandwidth of the network. Although TCP achieves remarkable success in maximizing the utilization of the link and fairly sharing bandwidth between competing flows, in today's Internet environment, it has been reported that TCP substantially underutilizes network bandwidth over high-speed and long distance networks. In the last decade, researchers have been actively seeking new approaches to improve TCP performance over fast and long-distance networks.

It would be desirable for any new high-speed congestion control protocol to satisfy the following three requirements for successful deployment into the Internet: 1) improve the throughput of the connection to efficiently use the high-speed network link; 2) have good intra-protocol fairness, especially when the competing flows have different round trip times (RTTs); and 3) not reduce the performance of other regular TCP flows competing on the same path.

The third requirement may be referred to herein as "TCP friendliness," which means that any new protocol should only make better use of residual bandwidth, but not steal bandwidth from other TCP flows. In general, delay-based protocols estimate the packets backlogged in the bottleneck queue and compare it with a threshold γ. If the backlog is larger than γ, the sending rate is reduced. Otherwise, the sending rate is increased (or remains the same). However, in order for delay-based protocols to be friendly to regular TCP, it requires correctly setting a threshold γ. If γ is set too large, the delay-based protocol may not timely detect the build-up of the queue.

Compound TCP (CTCP) has been previously proposed as a promising approach that satisfies all aforementioned requirements. CTCP is a synergy of both delay-based and loss-based congestion avoidance approaches, in which a scalable delay-based component is added to the standard TCP. This delay-based component can efficiently use the link capacity, and also can react early to congestion by sensing the changes in RTT. This way, CTCP achieves high link utilization, good RTT fairness and TCP friendliness.

To effectively detect early congestions, CTCP requires estimating the backlogged packets at a bottleneck queue and compares this estimate to a predefined threshold γ. However, setting this threshold is particularly difficult in CTCP (and in many other similar delay-based approaches), because it largely depends on the network configuration and the number of concurrent flows that compete for the same bottleneck link, which are, unfortunately, unknown to end-systems. As a consequence, the original proposed CTCP with a fixed γ may still demonstrate poor TCP-friendliness over under-buffered network links. In the worst case, TCP-unfairness of CTCP may even be comparable to that of HighSpeed TCP (HSTCP). One naïve solution to that problem is to configure γ to a very low value, but a very small γ may falsely detect congestion and adversely affect the throughput.

SUMMARY

Disclosed herein is a novel technique that greatly improves the TCP-friendliness of CTCP over such under-buffered network links without degrading the protocol efficiency to utilize the link capacity. Instead of using a pre-defined threshold, the disclosed approach, which may be referred to herein as "TUBE" (i.e., Tuning-By-Emulation), dynamically adjusts the threshold γ based on the network setting in which the flow is operating. The basic idea is to estimate the backlogged packets of a regular TCP along the same path by emulating the behavior of a regular TCP flow in runtime. Based on this, γ is set so as to ensure good TCP-friendliness. CTCP-TUBE can automatically adapt to different network configurations (i.e., buffer provisioning) and also concurrent competing flows. Extensive simulations on an NS2 simulator and emulations on a Windows implementation have confirmed the effectiveness of CTCP-TUBE. Although TUBE is proposed to improve the TCP-friendliness of CTCP, it may also shed light on parameter tuning for general delay-based approaches as well.

DETAILED DESCRIPTION

Overview of CTCP

Figure 1:
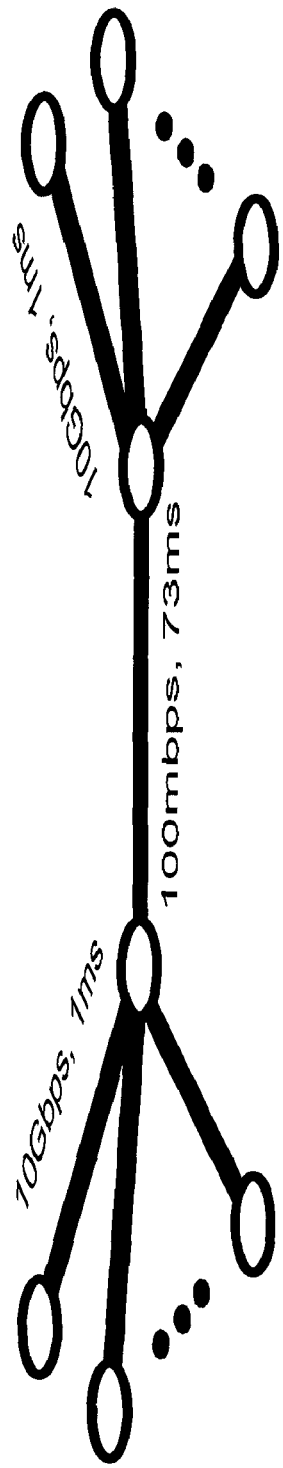
FIG. 1 depicts a "dumbbell" topology for simulation of CTCP-TUBE using an NS2 simulator.

CTCP is a synergy of both delay- and loss-based approaches. It contains two components that jointly control the sending rate of a TCP sender. A new state variable is introduced in current TCP Control Block, namely, dwnd (delay window), which controls this delay-based component in CTCP. The conventional cwnd (congestion window) controls the loss-based component. Then, the TCP sending window (called window hereafter) may now be calculated as follows: Win=min(cwnd+dwnd,awnd), where awnd is the advertised window from the receiver.

Cwnd is updated in the same way as in the regular TCP in the congestion avoidance phase, i.e., cwnd is increased by one MSS every RTT and halved upon a packet loss event. Specifically, cwnd is updated as follows:

$$cwnd(t+1) = \begin{cases} cwnd(t) + 1/win(t), & \text{on receiving a positive } ACK \\ cwnd(t)/2, & \text{if loss is detected} \end{cases}$$

Dwnd is updated based on the delay information. It uses an approach similar to TCP Vegas to detect early congestion in the network path. More specifically, CTCP estimates the number of backlogged packets of the connection by following algorithm:

Expected=win/baseRTT

Actual=win/RTT

Diff=(Expected−Actual)×baseRTT

The baseRTT is an estimation of the transmission delay of a packet. The Expected gives the estimation of throughput achieved if the network path is not overrun. The Actual stands for the actual throughput. Then, Diff stands for the amount of data that was injected into the network in the last round but does not pass through the network in the current round, i.e., the amount of data backlogged in the bottleneck queue. An early congestion is detected if the number of packets in the queue is larger than the threshold $\gamma$, i.e., if diff<$\gamma$, the network path is determined as under-utilized; otherwise, the network path is considered as congested. CTCP updates its dwnd based on the following rules:

$$dwnd(t+1) = \begin{cases} dwnd(t) + (\alpha \cdot win(t)^h - 1)^+, & \text{if } diff < \gamma \\ (dwnd(t) - \tau, \cdot diff)^1, & \text{if } diff \geq \gamma \\ \left(win(t) \cdot (1-\beta) - \frac{cwnd}{2}\right)^+, & \text{if loss is detected,} \end{cases}$$

Parameters of $\alpha$, $\beta$, $\zeta$ and k and are tuned to have comparable scalability to HSTCP when there is absence of congestion.

The slow-start behavior of CTCP remains the same as regular TCP. The delay-based component only kicks in the congestion avoidance stage.

From the control laws shown above, it essentially requires the connection to have at least $\gamma$ packets backlogged in the bottleneck queue to detect early congestion. Previously, a fixed value, $\gamma$=30 packets, was used after a number of empirical experiments. Although this setting achieves a pretty good tradeoff between TCP fairness and throughput in a testing environment, it fails to maintain good TCP-friendliness over links that are either poorly buffered, or have many competing flows. To demonstrate this, the following simulation was performed using an NS2 simulator.

FIG. 1 depicts a dumb-bell topology that was used in this simulation. The bottleneck buffer size was 110 packets. Note that such a network setup is severely under-buffered, since the buffer size is less than 10% of BDP (or sustaining only 14ms transmission) of the network path.

Figure 2:
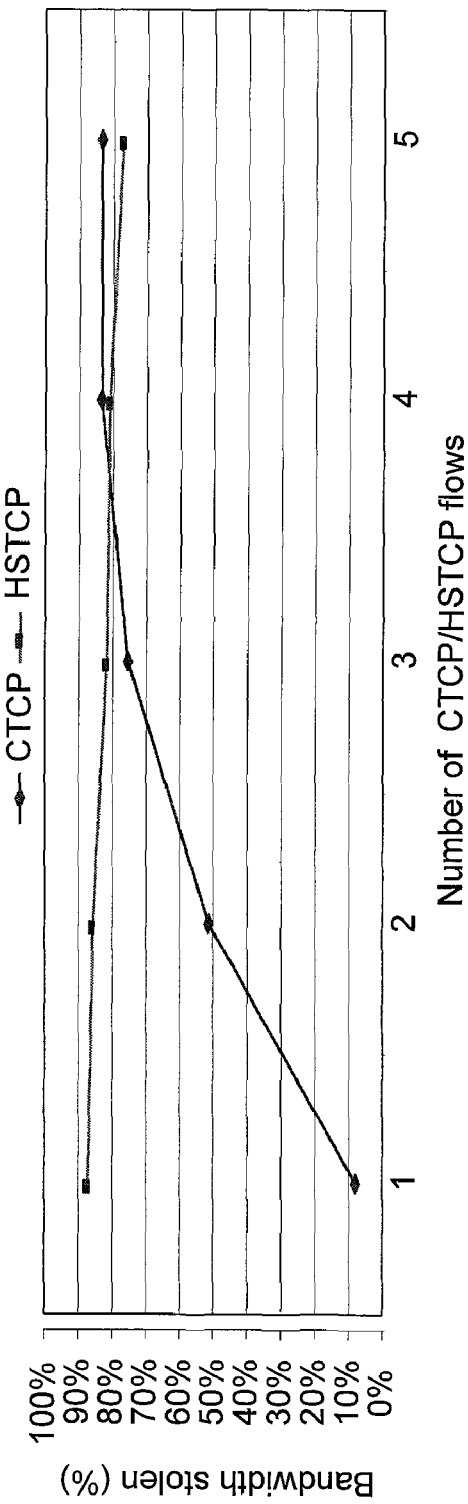
FIG. 2 provides a graph of bandwidth that is "stolen" when the number of high-speed flows increases.

One regular TCP flow was run against an increasing number of CTCP and HSTCP flows. The bandwidth stolen is shown in FIG. 2. The bandwidth stolen is a metric that quantifies the impact on throughput of new high-speed protocols on regular TCP flows. It is defined as the ratio between the throughput of regular TCP when they compete with high-speed flows and when they compete with same number of regular TCP flows. For a high-speed protocol to be fair, the value of bandwidth stolen should be low so as to not reduce the throughput for regular TCP flows.

FIG. 2 clearly shows that when there is only one CTCP flow competing with one regular TCP flow, CTCP can retain pretty good TCP friendliness. However, with an increase of the CTCP flows, CTCP becomes increasing unfair to regular TCP. When there are five CTCP flows competing with one regular TCP flow, the regular TCP flow loses over 80% of throughput compared to that if it is competing with five regular TCP flows. This is comparable to HSTCP.

The reason behind this phenomenon can be explained as follows. When there are only two flows in the network, the buffer is sufficient for each flow, i.e., each flow can get around 60 packets queued in the network buffer. Therefore, the delay-based component of CTCP can robustly detect congestion and retreat gracefully by decreasing dwnd. However, with the increase of the flow number, each flow gets fewer shares in the network buffer. As a consequence, the delay-based component in CTCP is less effective in detecting early congestion. When the flow number reaches four, the average buffer allocated for each flow is less than $\gamma$=30. Thus, the delay-based component loses the ability to detect early congestion and it behaves as aggressively as HSTCP. In this network setting, the pre-defined $\gamma$=30 is too high.

A naïve approach to fix this might choose a very small $\gamma$, e.g., one or two packets, which should be sufficiently small for most of practical network links. However, such small $\gamma$ will make the delay-based component too sensitive to delay jitter in the network path and generate a lot of false alarms, which in turn hurts the throughput. In summary, a mechanism that can automatically adjust the parameter $\gamma$ is critical for CTCP to work well in a general network setting. Over under-buffered links, $\gamma$ should be set to small to ensure TCP-friendliness. Over sufficiently buffered links, $\gamma$ should be adjusted to a high value to achieve better throughput.

TCP Tube

Setting $\gamma$ is very challenging in practice, because it is affected by the router buffer size and the number of concurrent competing flows. A previous model of CTCP shows that $\gamma$ should at least be less than $$\frac{B}{m+1}$$

to ensure the effectiveness of early congestion detection, where m and l present the flow number of concurrent regular TCP flows and CTCP flows that are competing for the same bottleneck link. Generally, both B and (m+l) are unknown to end-systems. It is even very difficult to estimate them from end-systems in real-time, especially the number of flows, which can vary significantly over time. Fortunately there is a way to directly estimate the ratio $$\frac{B}{m+1},$$

even though the individual variables B or (m+l) are hard to estimate.

Assume there are (m+l) regular TCP flows in the network. These (m+l) flows should be able to fairly share the bottleneck capacity in steady state. Therefore, they should also get roughly equal share of the buffers at the bottleneck, which should equal to $$\frac{B}{m+1}.$$

For such a regular TCP flow, although it does not know either B or (m+l), it can still infer B/m+l easily by estimating its backlogged packets, which is a rather mature technique widely used in many delay-based protocols.

In Tuning-by-Emulation, or TUBE, the sender may emulate the congestion window of a regular TCP. With this emulated regular TCP window, the queue size of a regular TCP, $Q_r$, that competes with the high-speed flow in the same network path can be estimated. $Q_r$ can be regarded as a conservative estimate of $$\frac{B}{m+1},$$

assuming the high-speed flow is more aggressive than regular TCP. Therefore, if we choose CTCP $\gamma \leq Q_r$, we can pretty well ensure its TCP-friendliness.

In CTCP, there is already an emulation of regular TCP as the loss-based component. The buffer occupancy of a competing regular TCP flow can be estimated from a state that CTCP already maintains. The details of TUBE algorithm is elaborated as follows.

We choose an initial $\gamma$. After every round, we calculate diffusing the following Equation:

Expected=win/baseRTT

Actual=win/RTT

Diff=(Expected−Actual)*baseRTT

The baseRTT is an estimation of the transmission delay of a packet. The Expected gives the estimation of throughput achieved if the network path is not overrun. The Actual stands for the actual throughput. Then, Diff stands for the amount of data that was injected into the network in the last round but does not pass through the network in the current round, i.e., the amount of data backlogged in the bottleneck queue. At the same time, we estimate the backlogged packets of a regular TCP with Expected_reno=cwnd/baseRTT Actual_reno=cwnd/RTT Diff_reno=(Expected_reno−Actual_reno)*baseRTT However, since regular TCP reaches its maximum buffer occupancy just before a loss, we may only use the diff_reno calculated in the last round before a loss happens to update $\gamma$. We choose a $\gamma^* <$ diff_reno and every time CTCP gets a loss, it updates $\gamma$ with an exponentially moving average, $\gamma=(1-\lambda)\gamma+\lambda\cdot\gamma^*$.

Figures 3, 4:
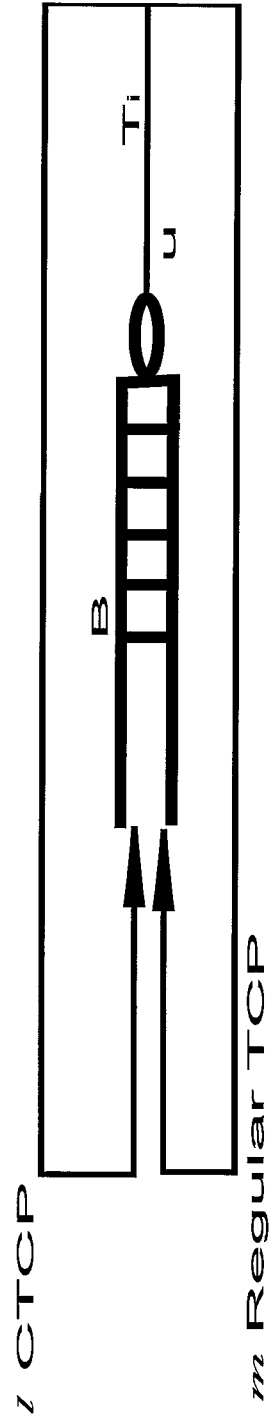
FIG. 3 provides pseudo-code for an example embodiment of TUBE.
FIG. 4 is a simple network topology containing one bottleneck.

FIG. 3 shows the pseudo-code of the TUBE algorithm. A new state variable, diff_reno, is added. Although diff_reno is updated every round, only the value before a packet loss is used to update $\gamma$. We further bound $\gamma$ within a range [$\gamma_{low}$, $\gamma_{high}$]. Note that in line 17, dif_reno is set to invalid after updating. This is to prevent using stale diff_reno data when there are consecutive losses between which no diff_reno sample is taken.

When setting gamma with TUBE, CTCP should not steal bandwidth from regular TCP. Further, although each CTCP flow may individually execute TUBE to select $\gamma$ for its own. These values should converge to a common value among all competing CTCP flows with same baseRTT. Our analysis is based on a simple network topology containing one bottleneck, as shown in FIG. 4, in which u stands for the link capacity; B is the buffer size on the bottle-neck link; and Ti is the transmission delay.

With the system model shown in FIG. 4, CTCP-TUBE will not steal bandwidth from competing regular TCP flows. We assume all packet losses are caused by buffer overflow and synchronized. Since the loss-based component in CTCP emulates the behavior of a regular TCP, all competing regular TCP flows and the loss-based components in CTCP flows should converge, and they should have the same window size before hitting a packet loss. We denote $Q_r$ the estimated number of backlogged packets before a regular TCP hits a loss on the link. With TCP-TUBE, $\gamma\gamma$ is set to be a value smaller than $Q_r$. Moreover, since with CTCP, win=(cwnd+dwnd)>cwnd, the delay-based component of CTCP would detect early congestion before a packet loss. As a consequence, dwnd would gracefully reduce as queue is larger than $\gamma\gamma$.

Figure 5:
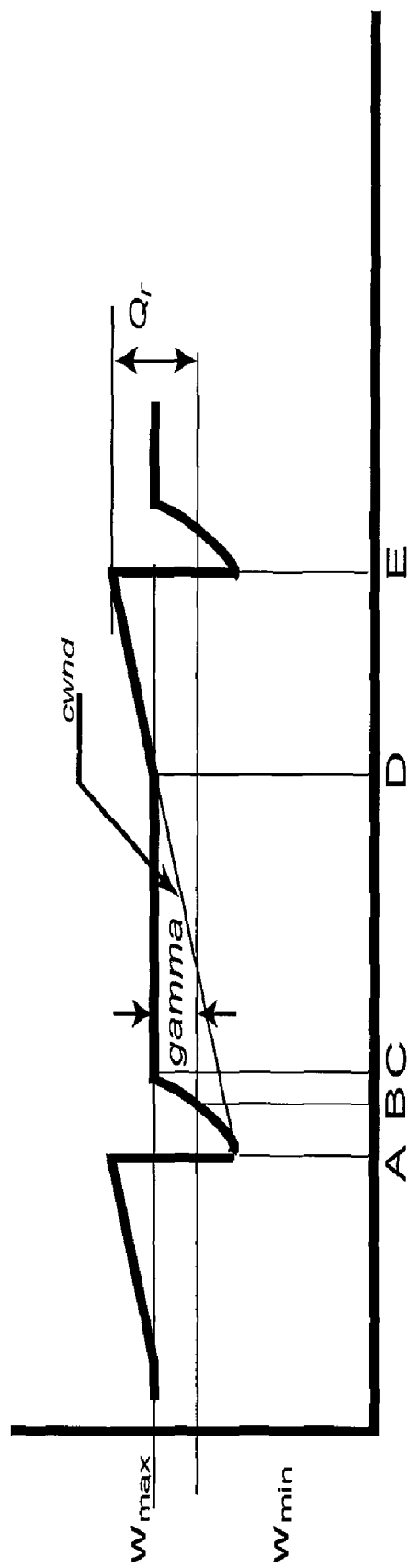
FIG. 5 depicts the evolution of a CTCP window.

FIG. 5 shows the evolution of CTCP window with TUBE. At point D, dwnd is approaching zero. From then, CTCP is just controlled by its loss-based component. And at time E, buffer overflows and all flows sense packet loss. Since all dwnds drop to zero when packet loss occurs, each regular TCP flow will get a maximal window size as if all were regular TCP flows. As a consequence, the regular TCP flows will receive same through-put as if they are competing with other regular TCP flows.

CTCP flows with TUBE will have same y at the steady state, if they have same base RTT. Since the loss-based component of CTCP emulates the behavior of a regular TCP flow, they should converge to same throughput, if their baseRTTs are same. Therefore, they will also sense the same backlogged packets on the bottleneck before a packet loss, i.e., $Q_r$. So their $\gamma$ will converge.

Note that if two CTCP flows have different base RTT, they may stabilize at different $\gamma$. The one with shorter RTT may estimate a larger $\gamma$, and the one with longer RTT may get a smaller $\gamma$. It is reasonable as the loss-based component for shorter flow may have a larger cwnd than that of a longer RTT flow. However, this does not have much effect on CTCP's fairness metric.

Exemplary Computing Arrangement

Figure 6:
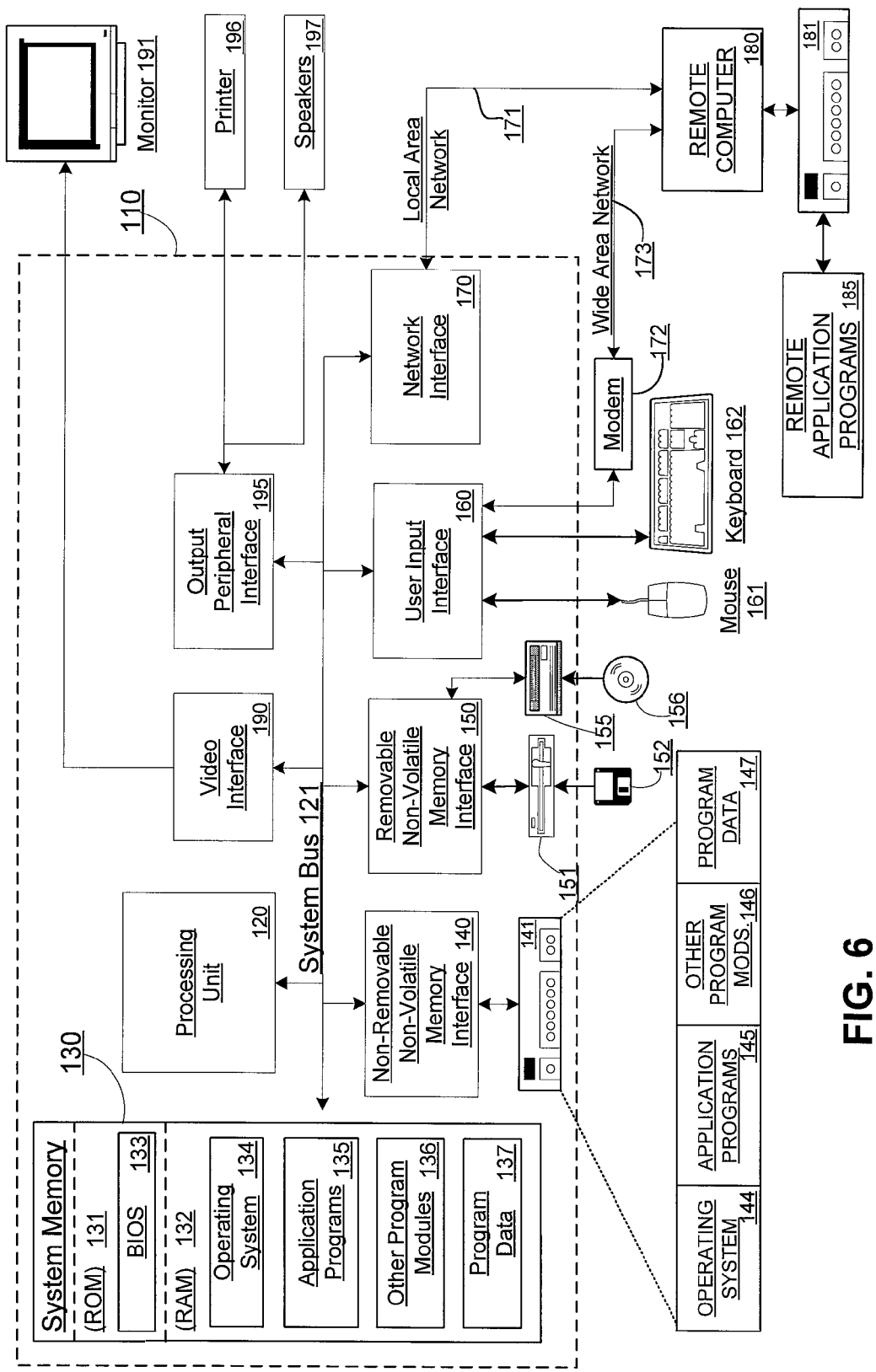
FIG. 6 is a block diagram of an example computing environment in which example embodiments and aspects may be implemented.

FIG. 6 shows an exemplary computing environment in which example embodiments and aspects may be implemented. The computing system environment 100 is only one example of a suitable computing environment and is not intended to suggest any limitation as to the scope of use or functionality. Neither should the computing environment 100 be interpreted as having any dependency or requirement relating to any one or combination of components illustrated in the exemplary operating environment 100.

Numerous other general purpose or special purpose computing system environments or configurations may be used. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 6 illustrates operating system 134, application programs 135, other program modules 136, and program data 137.

The computer 110 may also include other removable/non-removable, volatile/nonvolatile computer storage media. By way of example only, FIG. 6 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 6, provide storage of computer readable instructions, data structures, program modules and other data for the computer 110. In FIG. 6, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 6. The logical connections depicted in FIG. 6 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 6 illustrates remote application programs 185 as residing on memory device 181. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A processor-implemented method for improving TCP-friendliness of delay-based congestion control, the method comprising:
   choosing an initial value for a bottleneck queue size threshold;
   estimating, via the processor, the bottleneck queue size once every round trip interval;
   estimating, via the processor, a number of backlogged packets of a regular transfer control protocol (TCP) flow;
   detecting that a packet loss has occurred; and
   upon detection that a packet loss has occurred, updating the value of the bottleneck queue size threshold based on the estimated number of backlogged packets of the regular TCP flow calculated during the round trip interval immediately preceding the round trip interval in which the packet loss was detected.

2. The method of claim 1, wherein, if the bottleneck queue size reaches the threshold, then the network is congested.

3. The method of claim 1, wherein the bottleneck queue size corresponds to the amount of data backlogged in the bottleneck queue.

4. The method of claim 1, wherein the amount of data backlogged in the bottleneck queue corresponds to the amount of data that was injected into the network in the last round but does not pass through the network in the current round.

5. The method of claim 1, wherein estimating the bottleneck queue size comprises estimating the bottleneck queue size based on a comparison between an actual throughput and an estimate of a throughput that would be achieved if the network path is not overrun.

6. The method of claim 5, wherein estimating the bottleneck queue size comprises estimating the bottleneck queue size based on an estimation of a transmission delay of a packet.

7. The method of claim 5, wherein the actual throughput is based on a TCP sending window size and a round trip interval.

8. The method of claim 7, wherein the estimate of the throughput that would be achieved is based on a TCP sending window size and an estimate of a transmission delay of a packet.

9. The method of claim 1, wherein the round trip time is a period corresponding to a time taken for a data packet to travel from a sender to a receiver plus a time taken for a corresponding acknowledgement to travel from the receiver back to the sender.

10. A processor-implemented method for improving TCP-friendliness of delay-based congestion control, the method comprising:
    choosing an initial value for a bottleneck queue size threshold;
    periodically estimating, via the processor, the bottleneck queue size based on a comparison between an actual throughput and an estimate of a throughput that would be achieved if the network path is not overrun;
    estimating, via the processor, a number of backlogged packets of a regular transfer control protocol (TCP) flow; and
    updating, via the processor, the value of the bottleneck queue size threshold when a packet loss is detected.

11. The method of claim 10, further comprising;
    updating the threshold with an exponentially moving average.

12. The method of claim 10, wherein estimating the bottleneck queue size comprises estimating the bottleneck queue size based on a difference between the actual throughput and the estimate of the throughput that would be achieved if the network path is not overrun.

13. The method of claim 10, wherein estimating the bottleneck queue size comprises estimating the bottleneck queue size based on an estimation of a transmission delay of a packet.

14. The method of claim 10, further comprising:
    bounding the threshold with a range from a minimum to a maximum.

15. A processor-implemented method for improving TCP-friendliness of delay-based congestion control, the method comprising:
    computing a delay window;
    computing a conventional congestion window;
    determining an advertised window from a receiver;
    defining, via the processor, a transfer control protocol (TCP) sending window as the minimum of the delay window, the congestion window, and the advertised window; and
    determining, via the processor, an amount of data backlogged in a bottleneck queue based on the TCP sending window.

16. The method of claim 15, wherein determining the amount of data backlogged in the bottleneck queue is also based on an estimate of a transmission delay of a packet.

17. The method of claim 15, wherein determining the amount of data backlogged in the bottleneck queue is also based on a round trip time taken for a data packet to travel from a sender to a receiver and back to the sender.

* * * * *